(12) United States Patent
Andrei et al.

(10) Patent No.: US 10,706,077 B2
(45) Date of Patent: Jul. 7, 2020

(54) PERFORMANCE OF DISTRIBUTED DATABASES AND DATABASE-DEPENDENT SOFTWARE APPLICATIONS

(71) Applicant: SAP SE, Walldorf (DE)

(72) Inventors: Mihnea Andrei, Issy les Moulineaux (FR); Mahesh Gadgil, Chelmsford, MA (US)

(73) Assignee: SAP SE, Walldorf (DE)

( * ) Notice: Subject to any disclaimer, the term of this patent is extended or adjusted under 35 U.S.C. 154(b) by 264 days.

(21) Appl. No.: 15/617,031

(22) Filed: Jun. 8, 2017

(65) Prior Publication Data

US 2018/0357298 A1    Dec. 13, 2018

(51) Int. Cl.
*G06F 17/30*   (2006.01)
*G06F 16/28*   (2019.01)
*G06F 16/27*   (2019.01)
*G06F 16/22*   (2019.01)

(52) U.S. Cl.
CPC ........ *G06F 16/285* (2019.01); *G06F 16/2282* (2019.01); *G06F 16/27* (2019.01)

(58) Field of Classification Search
CPC .. G06F 16/276; G06F 16/285; G06F 16/2282; G06F 16/27
See application file for complete search history.

(56) References Cited

U.S. PATENT DOCUMENTS

| | | | |
|---|---|---|---|
| 2009/0300040 A1* | 12/2009 | Kaijima | G06F 16/217 |
| 2010/0030824 A1* | 2/2010 | Shang | G06F 11/2094 |
| | | | 707/E17.044 |
| 2015/0066987 A1* | 3/2015 | Nelke | G06F 16/21 |
| | | | 707/781 |
| 2015/0227521 A1* | 8/2015 | Levari | G06F 16/278 |
| | | | 707/694 |
| 2016/0019254 A1* | 1/2016 | Vijayrao | G06F 16/235 |
| | | | 707/737 |
| 2017/0075812 A1* | 3/2017 | Wu | G06F 12/0893 |

* cited by examiner

*Primary Examiner* — Usmaan Saeed
*Assistant Examiner* — William P Bartlett
(74) *Attorney, Agent, or Firm* — Jones Day

(57) ABSTRACT

Computer-implemented systems and methods for categorizing tables of a database into groups are provided. A set of queries used to access a database are processed to generate a log that identifies for each of the queries (i) a database operation associated with the query, (ii) a table of the database accessed via the query, and (iii) a column or columns of the table used by the query to access the table. Database operation criteria for categorizing database tables into groups are accessed. The criteria are based on a total number of times that a table is accessed by the set of queries and a number of times that the table is accessed using a column or group of columns. An algorithm that evaluates data of the log against the criteria is applied. The algorithm is configured to automatically categorize tables identified in the log into groups based on the evaluation.

20 Claims, 6 Drawing Sheets

| Criteria |
| --- |
| A total number of times that a table is accessed by a set of queries |
| A number of times that the table is accessed using a column or group of columns |
| A number of times that a read operation is executed on the table |
| A number of times that a write operation is executed on the table |
| A number of rows in the table |

FIG. 3A

| Criteria |
| --- |
| Identifying hot-access tables (*i.e.*, tables accessed at a relatively high frequency) |
| Whether tables are accessed using one particular column or multiple columns together more often than others |
| Ratios of read operations versus write operations executed on each table |
| Classifying small tables versus large tables based on the number of rows in each table |

FIG. 3B

PERFORMANCE OF DISTRIBUTED DATABASES AND DATABASE-DEPENDENT SOFTWARE APPLICATIONS

FIELD

The present description relates to computer-based techniques for improving performance of databases and database-dependent software applications.

BACKGROUND

Software applications are now being used to analyze large amounts of data in real time or near real time. It is desirable that such applications be extremely efficient and capable of providing analyses on very large relational databases having information stored in tables in a distributed manner on multiple nodes. A node may be a server, virtual server, or other type of computer system, and multiple nodes may be connected via a computing bus, a local area network (LAN), a wide area network (WAN), a storage area network (SAN), the Internet, or the like. These nodes may reside in the same location, or they may be stored in remote locations. When an application executes a transaction on the database, it may need to access multiple database tables. The multiple tables needed to execute the transaction may reside on a single node of the network, or the tables may reside on multiple nodes.

Performance of database-dependent software applications can be improved using various techniques. For instance, the technique known as "sharding" is one way to improve performance of a database-dependent application. Under the sharding technique, large database tables are partitioned based on some logic, and the partitions are stored on separate hardware. However, the sharding technique only provides significant performance gains when all of the data required to perform a transaction is present on the same node of a multi-node distributed database system.

SUMMARY

Computer-implemented systems and methods for categorizing tables of a database into groups are provided. In an example computer-implemented method for categorizing tables of a database into groups, a set of queries used to access a database are processed to generate a log that identifies for each of the queries (i) a database operation associated with the query, (ii) a table of the database accessed via the query, and (iii) a column or columns of the table used by the query to access the table. Database operation criteria for categorizing database tables into groups are accessed. The database operation criteria are based on a total number of times that a table is accessed by the set of queries and a number of times that the table is accessed using a column or group of columns. An algorithm that evaluates data of the log against the criteria database operation criteria is applied. The algorithm is configured to automatically categorize tables identified in the log into groups based on the evaluation.

In another example computer-implemented method for categorizing tables of a database into groups, a set of queries used to access a database are processed with a processing system to generate a log. The log identifies for each of the queries (i) a database operation associated with the query, (ii) a table of the database accessed via the query, and (iii) a column or columns of the table used by the query to access the table. Criteria for categorizing database tables into groups are accessed with the processing system. The criteria are based on a total number of times that a table is accessed by the set of queries, a number of times that the table is accessed using a column or group of columns, a number of times that a read operation is executed on the table, a number of times that a write operation is executed on the table, and a number of rows in the table. An algorithm that evaluates data of the log against the criteria is applied. The algorithm is configured to automatically categorize tables identified in the log into multiple groups based on the evaluation.

An example system for categorizing tables of a database into groups includes a processing system and computer-readable memory in communication with the processing system encoded with instructions for commanding the processing system to execute steps. In executing the steps, a set of queries used to access a database are processed to generate a log that identifies for each of the queries (i) a database operation associated with the query, (ii) a table of the database accessed via the query, and (iii) a column or columns of the table used by the query to access the table. Database operation criteria for categorizing database tables into groups are accessed. The database operation criteria are based on a total number of times that a table is accessed by the set of queries and a number of times that the table is accessed using a column or group of columns. An algorithm that evaluates data of the log against the criteria database operation criteria is applied. The algorithm is configured to automatically categorize tables identified in the log into groups based on the evaluation.

An example non-transitory computer-readable storage medium for comprises computer executable instructions which, when executed, cause a processing system to execute steps. In executing the steps, a set of queries used to access a database are processed to generate a log that identifies for each of the queries (i) a database operation associated with the query, (ii) a table of the database accessed via the query, and (iii) a column or columns of the table used by the query to access the table. Database operation criteria for categorizing database tables into groups are accessed. The database operation criteria are based on a total number of times that a table is accessed by the set of queries and a number of times that the table is accessed using a column or group of columns. An algorithm that evaluates data of the log against the criteria database operation criteria is applied. The algorithm is configured to automatically categorize tables identified in the log into groups based on the evaluation.

The subject matter described herein provides many technical advantages. As described below, the computer-based techniques of the present disclosure improve the performance and responsiveness of distributed databases and database-dependent computer applications. These improvements are achieved by distributing tables of a database among nodes of a network based on an output of an algorithm. The algorithm operates in an automatic manner (e.g., without human intervention or requiring only minimal human intervention) to analyze database query logs (e.g., Structured Query Language (SQL) logs) and determine tables of the database that should be grouped together on a common node. The intelligent grouping of the tables provided by the algorithm enables the aforementioned improvements in performance and responsiveness. These technical advantages and others are described in detail below.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 3A and 3B depict exemplary criteria used in categorizing database tables into groups, in accordance with embodiments of the present disclosure.

DETAILED DESCRIPTION

As explained above, computer applications are now being used to provide analyses on very large databases. Due to the sizes of such databases, all data of a database often cannot be stored on a single node (e.g., a single server, a single computer system, etc.), and instead, tables of the database must be distributed among multiple different nodes. Such nodes may comprise a plurality of networked nodes that are accessible by a computer application. To illustrate an example of this, reference is made to FIG. 1. This figure depicts an exemplary network comprising multiple networked nodes 102A, 102B, 102C that are accessible by a database-dependent software application 104, in accordance with embodiments of the present disclosure.

Figure 1:
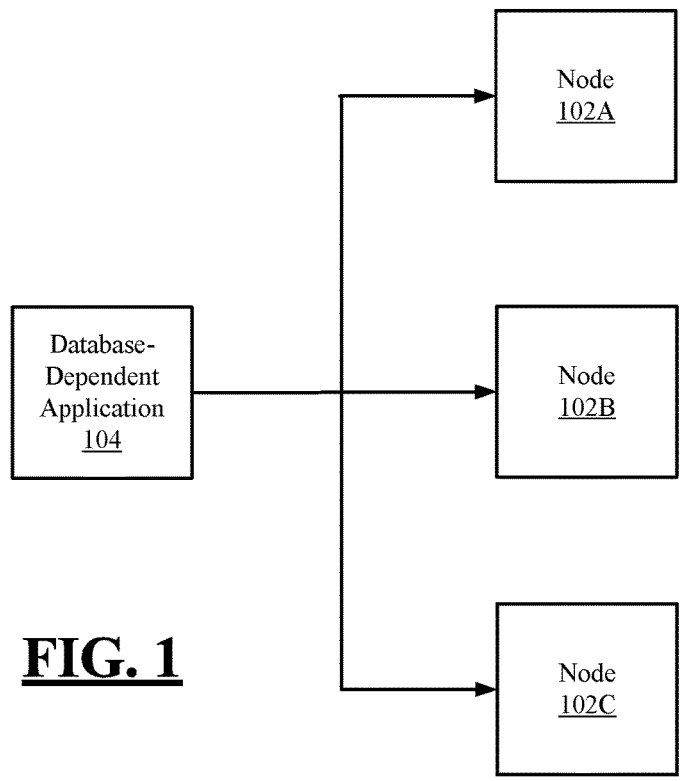
FIG. 1 illustrates an exemplary network comprising multiple networked nodes that are accessible by a database-dependent software application, in accordance with embodiments of the present disclosure.

In FIG. 1, each of the nodes 102A, 102B, 102C is a server or other type of computer system including storage for storing data of a database. Specifically, each of the nodes 102A, 102B, 102C has storage for storing one or more tables of the database. The database tables distributed across the nodes 102A, 102B, 102C together make up the complete database, which may be very large. For instance, in some examples, the database may comprise tens of thousands of tables distributed across the nodes 102A, 102B, 102C. Although the example of FIG. 1 depicts three nodes 102A, 102B, 102C, other examples utilize a different number of nodes (e.g., two nodes, more than three nodes) for storing the tables of the database. As the sizes of databases grow, a number of nodes needed to store the data of a database may increase.

The nodes 102A, 102B, 102C may be connected via a computing bus, a local area network (LAN), a wide area network (WAN), a storage area network (SAN), the Internet, or the like. The nodes 102A, 102B, 102C may reside in the same location, or they may reside in remote locations. In some embodiments, the nodes 102A, 102B, 102C may be networked according to a grid framework (e.g., to form a grid network). In a grid framework, the multiple nodes 102A, 102B, 102C form a grid, where each node of the grid hosts data (e.g., one or more tables) of the database.

The application 104 of FIG. 1 is a computer application executed on a computer system (e.g., a desktop computer, laptop, server, tablet computer, smartphone, etc.). The application 104 is referred to as a "database-dependent" application because the application 104 is configured to read data from the database distributed across the nodes 102A, 102B, 102C and to write data to this database. It is desirable that the database-dependent application 104 be efficient in performing such read and write operations on the database. For instance, in embodiments, it is desirable that the application 104 be capable of analyzing large amounts of data from the database in real time or near real time.

When the application 104 executes a transaction on the database, it may need to access multiple database tables. The multiple tables needed to execute the transaction may reside on a single node of the network, or the tables may be stored on multiple nodes. If the tables reside on the same, single node, the application 104 can access the tables in a relatively efficient, high-performance manner. By contrast, if the tables do not reside on the same node, this results in undesirable latency and bottlenecks. Determining a scheme for distributing database tables across the nodes 102A, 102B, 102C in a manner that reduces latency and bottlenecks can be extremely difficult and time-consuming. Modern databases can include tens of thousands of tables, and manual procedures (e.g., procedures performed by humans) are generally inadequate for determining suitable distributions of such tables. Accordingly, the present inventors have observed a need for automated, computer-based techniques for determining an optimized distribution of database tables across multiple nodes of a network.

Embodiments of the present disclosure are directed to computer-implemented systems and methods that may satisfy this need. As described below, the computer-based techniques of the present disclosure improve the performance and responsiveness of distributed databases and database-dependent computer applications. Specifically, the computer-based techniques described herein provide these improvements by ensuring that a higher number of database transactions can be performed using only a single node of a distributed, multi-node database system. To achieve this, computer-based systems and methods are used to automatically (e.g., without human intervention or requiring only minimal human intervention) categorize tables of the database into various groups (e.g., buckets). The tables categorized into a given group should be stored together on a single node of the network. After identifying the groups of tables, the tables of the database are stored to the nodes of the database system based on the groupings.

In embodiments, the groups into which tables are categorized include (i) groups of tree schema tables, (ii) groups that each includes a single table that is eligible for partitioning, and (iii) groups of other tables that are not candidates for partitioning. As described below, the computer-based systems and methods apply various criteria in multiple steps to categorize tables into the different groups.

Figure 2:
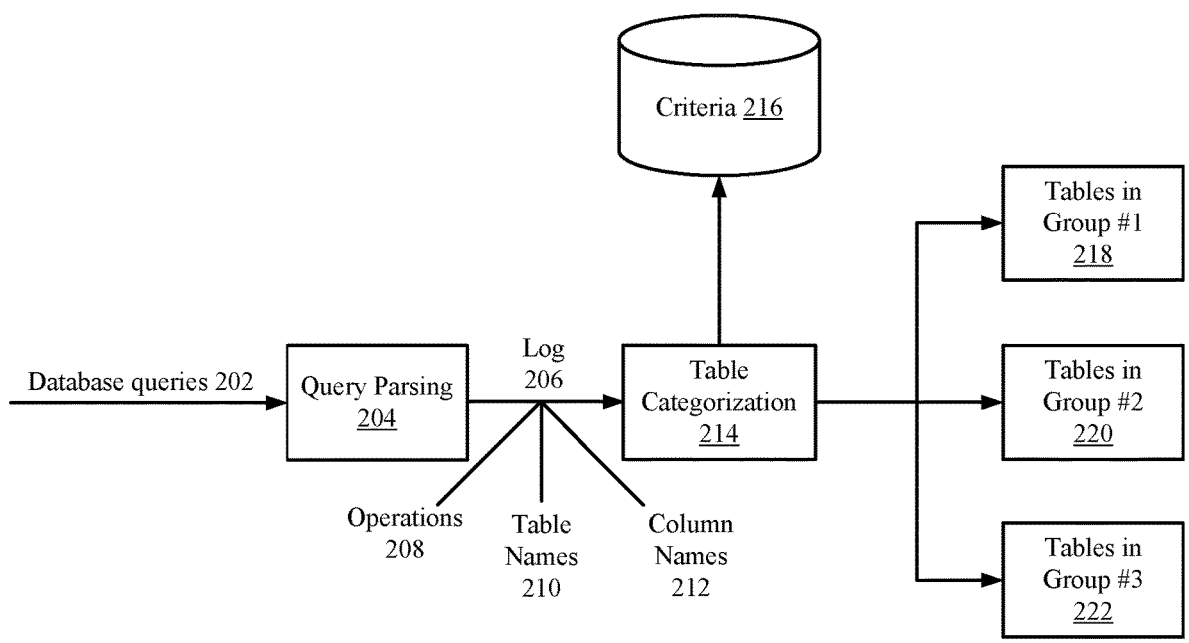
FIG. 2 is a block diagram illustrating an example system for categorizing tables of a database into groups, in accordance with embodiments of the present disclosure.

To further illustrate aspects of the computer-implemented systems and methods described herein, reference is made to FIG. 2. This figure is a block diagram illustrating an example system for categorizing tables of a database into groups, in accordance with embodiments of the present disclosure. As shown in this figure, a set of database queries 202 used to access a database are received at a query parsing module 204. The database may be a relatively large database with tables distributed across a multi-node database system, as described above. The queries 202 are used in performing both read operations and write operations on the database, in embodiments, and may include SQL statements comprising select, insert, update, and delete statements.

In embodiments, the set of queries 202 are queries captured from a particular software application. For instance, the set of queries may comprise a relatively large number of queries (e.g., tens of thousands of queries) executed by the particular software application over a period of time (e.g., one or more days, weeks, or months, etc.). Because the queries 202 are relatively large in number and are captured over a period of time, they may be representative of typical database actions that the software application often executes. Because the queries are captured from a particular (e.g., single) software application in embodiments, the resulting categorization of database tables is specifically tailored to increase performance of the particular software application.

The query parsing module 204 receives the queries 202 and processes them to generate a log 206. The log 206, which may be referred to as a "SQL log" in embodiments, identifies for each of the queries 202 (i) a database operation 208 associated with the query, (ii) a table 210 of the database accessed via the query, and (iii) a column or columns 212 of the table used by the query to access the table. In embodiments, the query parsing module 204 receives a SQL trace with SQL statements and parses the SQL statements to separate out the SQL operations, table names, and column names for each of the statements. The SQL operations, table names, and column names make up the log 206. In embodiments, the query pursing module 204 comprises a parsing algorithm executed on a processing system (e.g., a central processing unit (CPU)). Suitable parsing algorithms for generating the log 206 are known to those of ordinary skill in the art.

A table categorization algorithm 214 is applied to the log 206 to automatically (e.g., without human intervention or requiring only minimal human intervention) categorize tables identified in the log 206 into different groups. The groups into which the tables are categorized may also be referred to as "buckets" or "bins." Thus, as shown in FIG. 2, the table categorization algorithm 214 may categorize a first set of tables into a first group 218, a second set of tables into a second group 220, and a third set of tables into a third group 222, where each of the groups can include a single table or multiple tables. Although three groups of tables are utilized in the example of FIG. 2, in other embodiments, tables are categorized into a greater number of groups or a smaller number of groups. In some embodiments, a group of tables comprises a set of tables that follows a tree structure. A database schema is said to have a tree structure schema when a there is a root table and multiple child tables which in turn can have multiple children of their own. All child tables point to the root table by using the root table's primary key. In embodiments, the table categorization algorithm 214 identifies columns on which a table can be partitioned, in addition to the groups of tables described above.

Using the groups of tables identified by the table categorization algorithm 214, tables of the database are distributed (e.g., stored) across nodes of a multi-node database system. The intelligent grouping of tables provided by the table categorization algorithm 214 enables the tables to be distributed in a manner that enables high performance and responsiveness. Specifically, the tables identified as being in a same group are stored on a single node, as opposed to being distributed across multiple nodes. For example, the tables of a group may be a set of tables that follows a tree structure (e.g., a tree schema), and all tables of this set are stored to a single node. By storing the tables of the respective groups in this manner, this helps to ensure that a higher number of the software application's database transactions can be performed using data from a single node. For instance, if the software application must access multiple tables of a tree schema to complete a transaction, storing all tables of the tree schema to a single node enables the transaction to be completed without the latency that would be incurred in accessing multiple nodes. The software application can thus access tables of the database in an efficient, high-performance manner, and the latency and bottlenecks that occur when the software application must carry out a transaction using multiple nodes are minimized or eliminated.

In categorizing tables into the groups (e.g., buckets), the table categorization algorithm 214 accesses and utilizes criteria 216. Specifically, the table categorization algorithm 214 evaluates data of the log 206 against the criteria 216 and automatically groups tables identified in the log 206 based on the evaluation. To illustrate aspects of the criteria 216, reference is made to FIG. 3A. In embodiments of the present disclosure, the criteria 216 are based on one or more of the factors listed in FIG. 3A: a total number of times that a table is accessed by the set of queries 202, a number of times that the set of queries 202 accesses the table using a particular column or group of columns, a number of times that the set of queries 202 executes a read operation on the table, a number of times that the set of queries 202 executes a write operation on the table, and a number of rows in the table. Criteria based on these factors are applied by the table categorization algorithm 214 in multiple steps in order to segregate tables into different groups. In embodiments, the criteria are implemented using a configuration file that provides values (e.g., threshold values, minimum values, etc.) against which the log 206 is evaluated.

FIG. 3B illustrates another set of criteria that may be utilized by the table categorization algorithm 214, in embodiments. As seen in the figure, the criteria may be based on an identification of "hot-access tables" (e.g., tables that are accessed at a relatively high frequency), whether tables are accessed using one particular column or group of columns (e.g., multiple columns together) more often than others, ratios of read operations versus write operations on each table, and classifications of small tables versus large tables based on the number of rows in each table.

Figure 4:
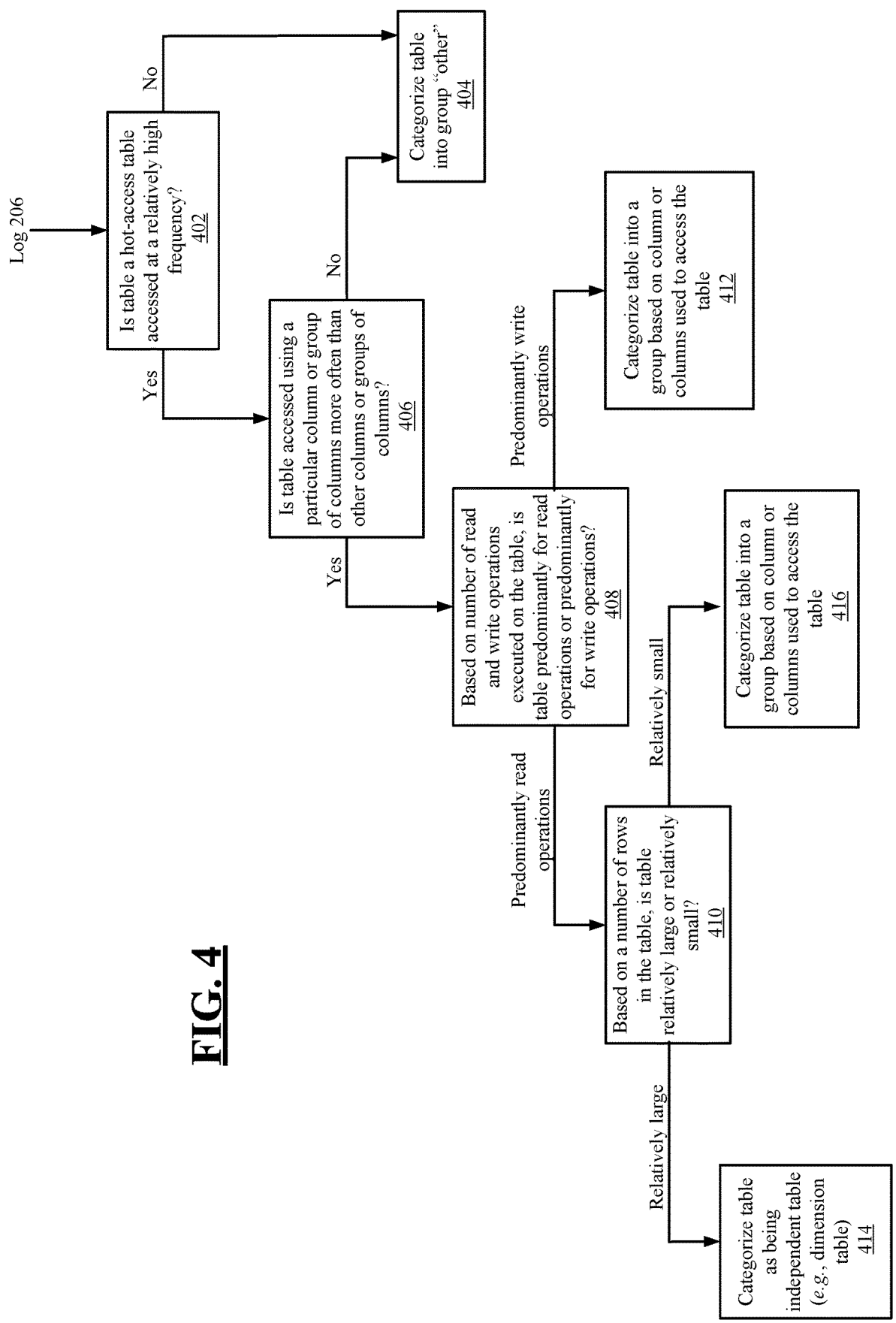
FIG. 4 is a flowchart depicting operations of an exemplary algorithm for evaluating data of a log against criteria, in accordance with embodiments of the present disclosure.

Steps of an algorithm that uses the criteria illustrated in FIGS. 3A and 3B are illustrated in FIG. 4. This figure is a flowchart depicting operations of an exemplary algorithm for evaluating data of a log against criteria, in accordance with embodiments of the present disclosure. The operations of the algorithm shown in FIG. 4 may be those performed by the table categorization algorithm 214 described above. The input to the algorithm is the log 206 (e.g., the SQL log) generated by the query parsing module 204. As described above, the log 206 identifies for each query of the set of input queries 202 an operation (e.g., a SQL operation) associated with the query, a table name corresponding to the table accessed by the query, and one or more columns of the table used by the query in accessing the table.

At operation 402, the log 206 is processed to determine a subset of tables identified in the log that are "hot-access" tables accessed at a relatively high frequency. To illustrate the operation 402, consider an example in which the log 206 includes data for 1,000 queries. In an embodiment, if 900 of the 1,000 queries access ten (10) tables, then the operation 402 may identify these ten tables as being hot-access tables. By contrast, if 100 of the 1,000 queries access fifty (50) different tables, then the operation 402 may identify these fifty tables as not being hot-access tables. In some embodiments, the hot-access tables are tables that are accessed by the queries 202 at a frequency that meets or exceeds a threshold. The threshold is a configurable value stored in a configuration file and may be modified by a user, in embodiments. In embodiments where such a configuration file is used, the configuration file may be understood as providing the criteria against which the log 206 is evaluated. For instance, the threshold value used in determining if a table is a hot-access table is a criterion against which the log 206 is evaluated.

The tables that are not identified as being hot-access tables are categorized into an "other" group at operation 404. The subset of tables identified as being hot-access tables are then evaluated at an operation 406. In the operation 406, the log 206 is processed to identify tables of the subset that are accessed using a particular column or group of columns more often than other columns or groups of columns. Such tables are understood as being accessed using a particular "key" more often than others. As an example, a "purchase order" table may be frequently accessed using a "customer ID" column. Many queries may request records of the purchase order table that match a particular customer ID value specified by the query. In this example, the customer ID column is the key with which the table is most often accessed.

In some embodiments, the key-access tables identified at the operation 406 are those that are accessed using the particular column or group of columns at a frequency that meets or exceeds a threshold. The key-access threshold value may be stored in the configuration file and may be modified by a user, in embodiments. The configuration file thus provides the specific criterion against which the log 206 is evaluated for making the key-access determination at step 406. The tables that are not identified as being key-access tables at the operation 406 are categorized into the "other" group at the operation 404.

The operations 402 and 406 may be understood as being "filters" for filtering out tables prior to assigning the remaining tables into different buckets. Specifically, the operation 402 is a first filter that filters out tables that are not accessed at a high frequency, and the operation 406 is a second filter that filters out tables that are not accessed using one particular key (e.g., one column or multiple columns together) more often than others. As described above, both filters utilize criteria (e.g., threshold values) specified in the configuration file, in embodiments.

The tables that are not filtered out by the operations 402 and 406 are next considered at operation 408. Specifically, for each of the tables not categorized into the "other" group following the operations 402 and 406, a determination is made as to whether the table is predominantly for read operations or predominantly for write operations. In embodiments, to make this determination, the table categorization tool 214 processes the log 206 to determine a first value indicative of a number of times that a read operation is executed on the table in the set of queries 202. The table categorization tool 214 further processes the log 206 to determine a second value indicative of a number of times that a write operation is executed on the table in the set of queries 202. Based on the first and second values, the table is classified as being predominantly for read operations or predominantly for write operations.

In embodiments, the operation 408 calculates a ratio:

$$\text{ratio} = 100 * \left(\frac{\text{reads}}{\text{reads} + \text{writes}}\right),$$

where "reads" is the number of times that a read operation is executed on the table in the set of queries 202, and "writes" is the number of times that a write operation is executed on the table in the set of queries 202. In the operation 408, a table is classified as being predominantly for read operations if the ratio value meets or exceeds a threshold. If the ratio value is less than the threshold, then the table is classified as being predominantly for write operations. The read-mostly/write-mostly threshold value may be stored in the configuration file and may be modified by a user, in embodiments. The configuration file thus provides the specific criterion used in evaluating the tables at the operation 408.

The tables that are classified as being predominantly for read operations are next considered at an operation 410. Specifically, for each of the tables categorized as being read-mostly tables, a determination is made as to whether the table is a relatively large table or a relatively small table. In embodiments, to make this determination, the table categorization tool 214 determines a number of rows included in the table. Based on the number of rows, the table is classified as being a relatively large table or a relatively small table. In embodiments, a table is classified as being a relatively large table if its number of rows meets or exceeds a threshold. If the number of rows is less than the threshold, then the table is classified as being a relatively small table. The large-table/small-table threshold value may be stored in the configuration file and may be modified by a user, in embodiments. The configuration file provides the specific criterion used in evaluating the tables at the operation 410.

The read-mostly tables that are classified as being relatively large are each categorized as being an independent table at an operation 414. In embodiments, independent tables are standalone tables that are not grouped with other tables. Thus, the group into which an independent table is categorized is a group containing only one table. By categorizing a table as being an independent table, this means that the table does not need to be co-located with other tables on a same node (e.g., there is no performance advantage by co-locating the independent table with other tables on a node). For instance, in embodiments, such independent tables are determined to not be candidates for a tree structure, and thus, they are not grouped with other tables. In some embodiments, the independent tables are determined to be dimension tables known to those of ordinary skill in the art. Dimension tables are commonly used in grid structure database schema. A database schema is said to have a grid structure schema when it has multiple tree schemas and a set of dimension tables. Dimension tables are fact tables, and the tables from tree schemas point to these dimension tables using the dimension tables' respective primary keys.

The write-mostly tables are considered at an operation 412, and the read-mostly tables that are classified as being relatively small are considered at an operation 416. Specifically, at the operation 412, for each of the tables categorized as being write-mostly tables, the table is categorized into a group based on the column or column (i.e., the key) that is used to access the table more often than other columns or groups of columns. Thus, for instance, tables that are most often accessed using a "customer ID" column are categorized into a first group, and tables that are most often accessed using a "product ID" column are categorized into a second group. Likewise, at the operation 416, for each of the read-mostly tables that are classified as being relatively small, the table is categorized into a group based on the column or column that is used to access the table more often than other columns or groups of columns.

Every table considered at the operations 412, 416 is placed into a group, and each of the groups resulting from the operations 412, 416 includes a single table or multiple tables. For instance, if multiple tables considered at the operations 412, 416 are most often accessed using a common key (i.e., a column or group of columns), then these tables are categorized into the same group. In embodiments, the multiple tables of this group may be understood as being tables of a common tree schema. By contrast, if only one table considered at the operations 412, 416 is most often accessed using a particular key, then that table is categorized into a group that includes no other tables. The single table of this group may be understood as being a single-table tree, in embodiments.

In the operations 412, 416, write-mostly tables considered at the operation 412 and read-mostly tables considered at the operation 416 may be categorized into the same group. For instance, a write-mostly table that is most often accessed using a particular key and a read-mostly table that is most often accessed using the same key will be categorized into the same group in the operations 412, 416. The separate paths of the flowchart may be understood as coming together at the operations 412, 416, thus enabling the tables considered by these operations to be grouped together, even though this may result in groups having both read-mostly tables and write-mostly tables.

By the completion of the algorithm, each table identified in the log 206 will have been categorized into one group. The tables categorized at the operations 412, 416 are grouped based on their use of a common access key (e.g., column or group of columns), as described above. The tables determined to be independent tables at the operation 414 are each understood as being categorized into a one-table group. Such independent tables do not need to be co-located with other tables on a same node, as described above (e.g., no performance advantage is gained by co-locating an independent table with other tables on the same node). Similarly, the tables categorized into the "other" group at the operation 404 are each understood as being categorized into a one-table group. Such "other" tables do not need to be co-located with other tables on a same node, and no performance advantage is gained by co-locating these tables with other tables.

In embodiments, the database tables identified in the log are stored to nodes of a network (e.g., a grid network) based on the categorizations. As explained above, all tables of a given group are stored on a single node, as opposed to being distributed across multiple nodes. By storing the tables in this manner, this helps to ensure that a larger number of database transactions can be performed using data from a single node, which mitigates or eliminates the latency that occurs when multiple nodes must be accessed to complete a transaction.

Figure 5:
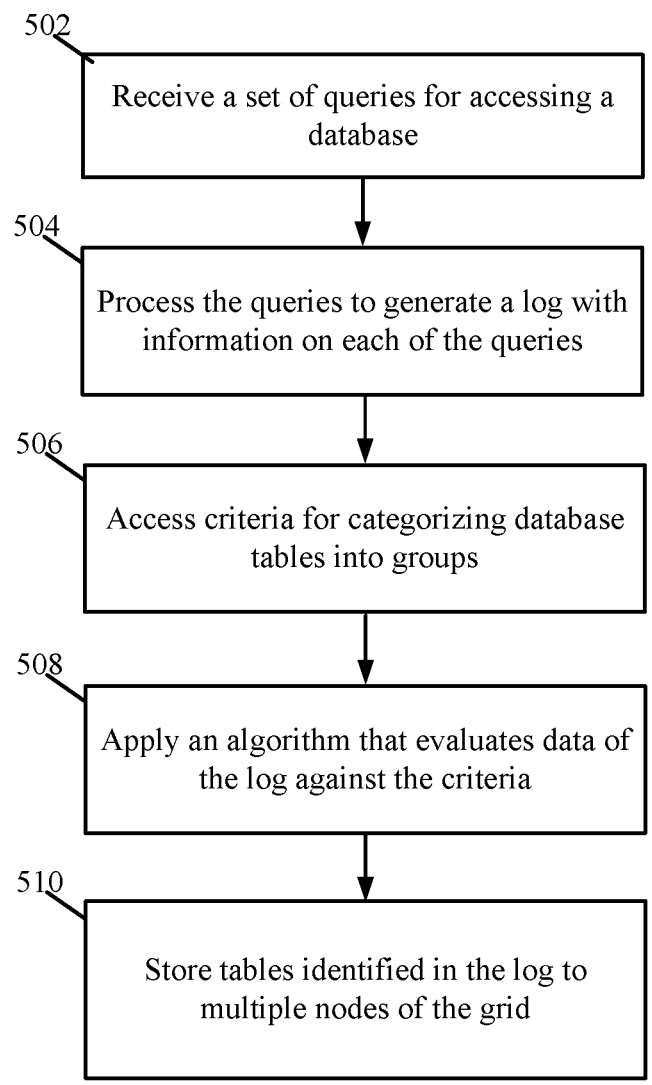
FIG. 5 is a flowchart depicting steps of an example method for categorizing tables of a database into groups, in accordance with embodiments of the present disclosure.

FIG. 5 is a flowchart depicting steps of an example method for categorizing tables of a database into groups, in accordance with embodiments of the present disclosure. At 502, a set of queries used to access a database are received. At 504, the set of queries is processed to generate a log that identifies for each of the queries (i) a database operation associated with the query, (ii) a table of the database accessed via the query, and (iii) a column or columns of the table used by the query to access the table.

At 506, database operation criteria for categorizing database tables into groups are accessed. In some embodiments, the criteria are based on a total number of times that a table is accessed by the set of queries and a number of times that the table is accessed using a column or group of columns. The criteria are also based on a number of times that a read operation is executed on the table, a number of times that a write operation is executed on the table, and a number of rows in the table, in embodiments.

At 508, an algorithm that evaluates data of the log against the criteria is applied. The algorithm is configured to automatically categorize tables identified in the log into groups based on the evaluation. At 510, the tables identified in the log are stored to nodes of a network based on the categorizations. In embodiments, all tables categorized into a given group are stored to a single node of the network. The output of the algorithm may be understood as providing a blueprint or layout of the groups (e.g., buckets) into which the tables could be stored. In embodiments, it is an end user's responsibility to store the tables to nodes as he or she desires, with the end-user's actions being informed by the blueprint or layout provided by the algorithm. In other embodiments, the tables identified in the log are automatically stored to nodes of the network based on the categorizations generated by the algorithm. In these embodiments, a computer-implemented method uses the categorizations to store the tables to the nodes in a manner that requires no human intervention or only minimal human intervention.

Figure 6A:
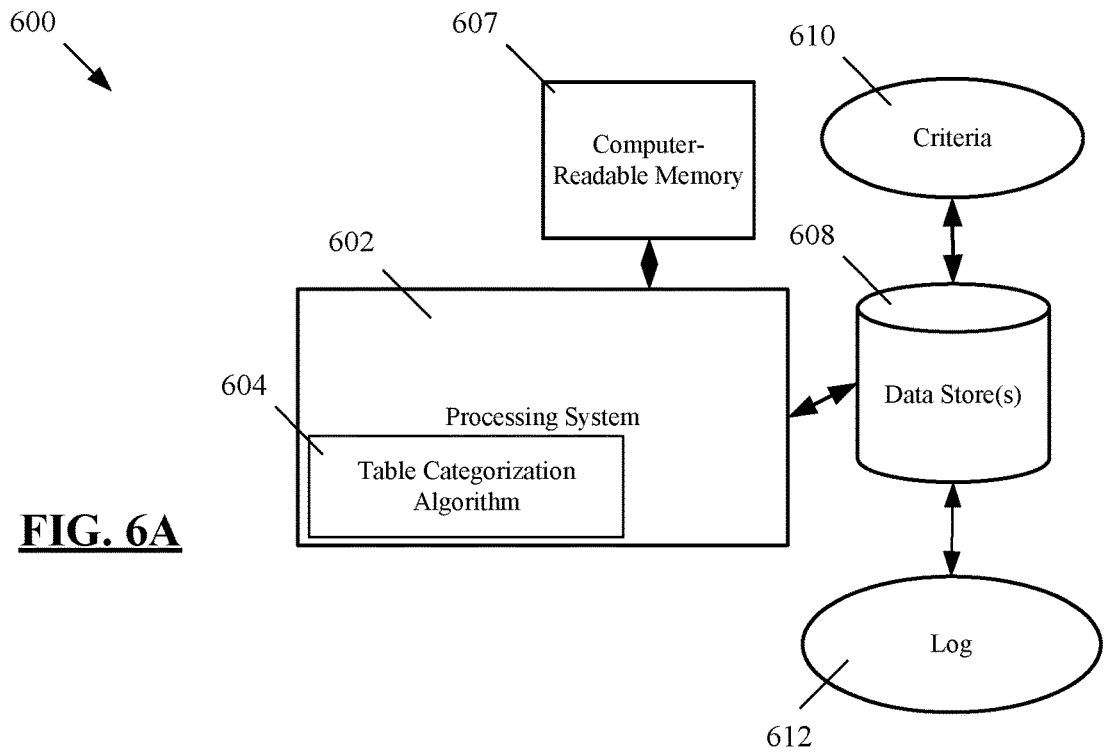
FIGS. 6A, 6B, and 6C depict example systems for implementing the techniques described herein.
Figure 6B:
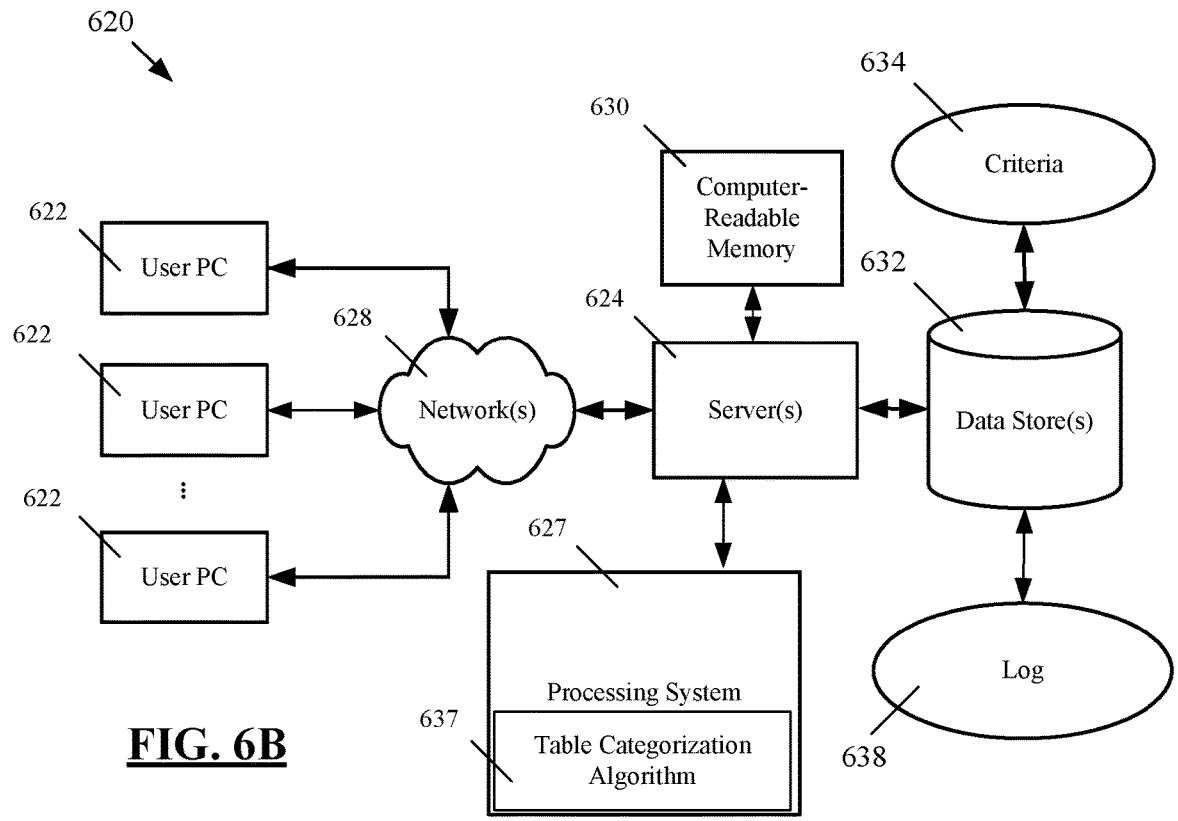
Figure 6C:
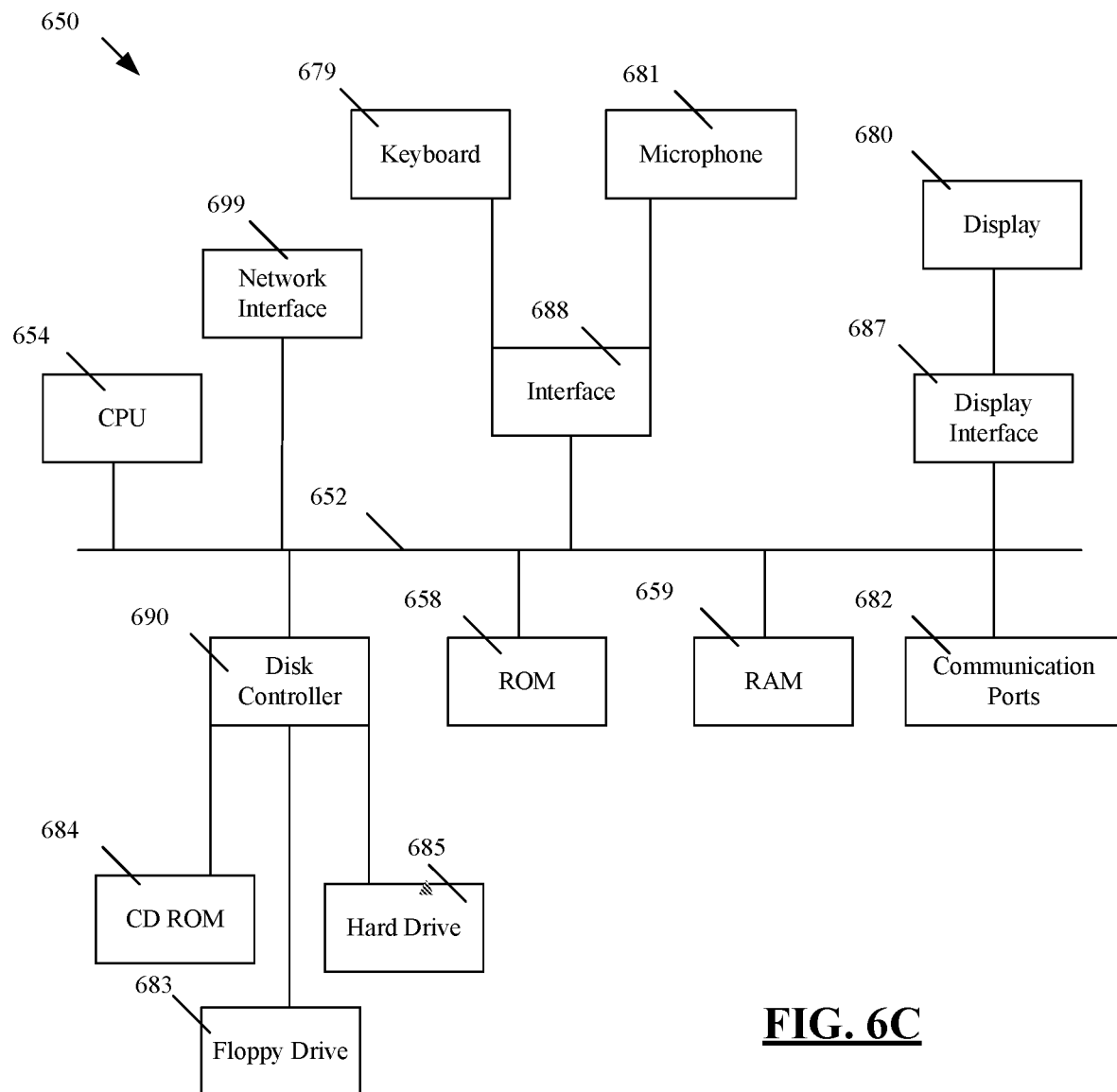

FIGS. 6A, 6B, and 6C depict example systems for implementing the techniques described herein for improving performance of distributed databases and database-dependent software applications. For example, FIG. 6A depicts an exemplary system 600 that includes a standalone computer architecture where a processing system 602 (e.g., one or more computer processors located in a given computer or in multiple computers that may be separate and distinct from one another) includes a table categorization algorithm 604 being executed on the processing system 602. The processing system 602 has access to a computer-readable memory 607 in addition to one or more data stores 608. The one or more data stores 608 may include criteria 610 as well as data of a log 612. The processing system 602 may be a distributed parallel computing environment, which may be used to handle very large-scale data sets.

FIG. 6B depicts a system 620 that includes a client-server architecture. One or more user PCs 622 access one or more servers 624 executing a table categorization algorithm 637 on a processing system 627 via one or more networks 628. The one or more servers 624 may access a computer-readable memory 630 as well as one or more data stores 632. The one or more data stores 632 may include criteria 634 as well as data of a log 638.

FIG. 6C shows a block diagram of exemplary hardware for a standalone computer architecture 650, such as the architecture depicted in FIG. 6A that may be used to include and/or implement the program instructions of system embodiments of the present disclosure. A bus 652 may serve as the information highway interconnecting the other illustrated components of the hardware. A processing system 654 labeled CPU (central processing unit) (e.g., one or more computer processors at a given computer or at multiple computers), may perform calculations and logic operations required to execute a program. A non-transitory processor-readable storage medium, such as read only memory (ROM) 658 and random access memory (RAM) 659, may be in communication with the processing system 654 and may include one or more programming instructions for performing methods (e.g., algorithms) for categorizing tables of a database into groups. Optionally, program instructions may be stored on a non-transitory computer-readable storage medium such as a magnetic disk, optical disk, recordable memory device, flash memory, or other physical storage medium.

In FIGS. 6A, 6B, and 6C, computer readable memories 607, 630, 658, 659 or data stores 608, 632, 683, 684 may include one or more data structures for storing and associating various data used in the example systems for categorizing tables of a database into groups. For example, a data structure stored in any of the aforementioned locations may be used to store data relating to criteria and/or a set of queries used by a computer application. A disk controller 690 interfaces one or more optional disk drives to the system bus 652. These disk drives may be external or internal floppy disk drives such as 683, external or internal CD-ROM, CD-R, CD-RW or DVD drives such as 684, or external or internal hard drives 685. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 690, the ROM 658 and/or the RAM 659. The processor 654 may access one or more components as required.

A display interface 687 may permit information from the bus 652 to be displayed on a display 680 in audio, graphic, or alphanumeric format. Communication with external devices may optionally occur using various communication ports 682.

In addition to these computer-type components, the hardware may also include data input devices, such as a keyboard 679, or other input device 681, such as a microphone, remote control, pointer, mouse and/or joystick. Such data input devices communicate with the standalone computer architecture 650 via an interface 688, in some embodiments. The standalone computer architecture 650 further includes a network interface 699 that enables the architecture 650 to connect to a network, such as a network of the one or more networks 628.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method of categorizing tables of a database into groups, the method comprising:
   processing a set of queries used to access a database with a processing system to generate a log that identifies for each of the queries (i) a database operation associated with the query, (ii) a table of the database accessed via the query, and (iii) a column or columns of the table used by the query to access the table;
   accessing with the processing system database operation criteria for categorizing database tables into groups, the database operation criteria being based on a total number of times that a table is accessed by the set of queries, and a number of times that the table is accessed using a column or group of columns; and
   applying an algorithm that evaluates data of the log against the database operation criteria, the algorithm being configured to (a) automatically categorize the database tables identified in the log into multiple groups based on the evaluation, (b) classify the database tables as being predominantly for read operations or predominantly for write operations based on a ratio between a number of times that a read operation is executed in the set of queries and a total number of times that a read operation and a write operation is executed on the database tables, wherein the database tables are classified as being predominantly for read operations when the ratio meets or exceeds a read threshold, and (c) grouping together the database tables classified as predominantly for read operations based on a number of rows within each database table and the database tables classified as predominantly for write operations based on the number of times that each database table is accessed using the column or the group of columns.

2. The computer-implemented method of claim 1, further comprising:
   storing the tables identified in the log to nodes of a network based on the categorized tables.

3. The computer-implemented method of claim 2, wherein the storing of the tables comprises:
   storing all tables categorized into a given group to a single node of the network.

4. The computer-implemented method of claim 1, wherein the database operation criteria are further based on a number of times that a read operation is executed on the table, a number of times that a write operation is executed on the table, and a number of rows in the table.

5. The computer-implemented method of claim 1, wherein the applying of the algorithm comprises:
   processing the log to determine a subset of the tables identified in the log, the subset comprising tables that are accessed by the set of queries at a frequency that meets or exceeds a threshold; and
   processing the log to identify tables from the subset that are accessed using a particular column or group of columns more often than other columns or groups of columns.

6. The computer-implemented method of claim 5, wherein the applying of the algorithm further comprises, for each of the tables identified from the subset:
   processing the log to determine a first value indicative of a number of times that a read operation is executed on the table in the set of queries;
   processing the log to determine a second value indicative of a number of times that a write operation is executed on the table in the set of queries; and
   classifying the table as being predominantly for read operations or predominantly for write operations based on the first and second values.

7. The computer-implemented method of claim 6, wherein the applying of the algorithm further comprises, for each of the tables classified as being predominantly for read operations:
   determining a number of rows included in the table; and
   classifying the table as being a relatively large table or a relatively small table based on the number of rows included in the table.

8. The computer-implemented method of claim 7, wherein the applying of the algorithm further comprises, for (i) each of the tables classified as being predominantly for write operations, and (ii) each of the tables classified as being a relatively small table:
   identifying a column or group of columns that are used to access the table more often than other columns or groups of columns; and
   categorizing the table into a group of the multiple groups based on the identified column or group of columns.

9. A computer-implemented method of categorizing tables of a database into groups, the method comprising:
   processing a set of queries used to access a database with a processing system to generate a log that identifies for each of the queries (i) a database operation associated with the query, (ii) a table of the database accessed via the query, and (iii) a column or columns of the table used by the query to access the table;
   accessing with the processing system criteria for categorizing database tables into groups, the criteria being based on a total number of times that a table is accessed by the set of queries, a number of times that the table is accessed using a column or group of columns, a number of times that a read operation is executed on the table, a number of times that a write operation is executed on the table, and a number of rows in the table; and
   applying an algorithm that evaluates data of the log against the criteria, the algorithm being configured to (a) automatically categorize the database tables identified in the log into multiple groups based on the evaluation, (b) classify the database tables as being predominantly for read operations or predominantly for write operations based on a ratio between a number of times that a read operation is executed in the set of queries and a total number of times that a read operation and a write operation is executed on the database tables, wherein the database tables are classified as being predominantly for read operations when the ratio meets or exceeds a read threshold, and (c) grouping together the database tables classified as predominantly for read operations based on a number of rows within each database table and the database tables classified as predominantly for write operations based on the number of times that each database table is accessed using the column or the group of columns.

10. The computer-implemented method of claim 9, further comprising:
storing the tables identified in the log to nodes of a network based on the automatically categorized tables.

11. A computer-implemented system for categorizing tables of a database into groups, the system comprising:
a processing system; and
computer-readable memory in communication with the processing system encoded with instructions for commanding the processing system to execute steps comprising:
processing a set of queries used to access a database to generate a log that identifies for each of the queries (i) a database operation associated with the query, (ii) a table of the database accessed via the query, and (iii) a column or columns of the table used by the query to access the table;
accessing database operation criteria for categorizing database tables into groups, the database operation criteria being based on a total number of times that a table is accessed by the set of queries, and a number of times that the table is accessed using a column or group of columns; and
applying an algorithm that evaluates data of the log against the database operation criteria, the algorithm being configured to (a) automatically categorize the database tables identified in the log into multiple groups based on the evaluation, (b) classify the database tables as being predominantly for read operations or predominantly for write operations based on a ratio between a number of times that a read operation is executed in the set of queries and a total number of times that a read operation and a write operation is executed on the database tables, wherein the database tables are classified as being predominantly for read operations when the ratio meets or exceeds a read threshold, and (c) grouping together the database tables classified as predominantly for read operations based on a number of rows within each database table and the database tables classified as predominantly for write operations based on the number of times that each database table is accessed using the column or the group of columns.

12. The computer-implemented system of claim 11, wherein the database operation criteria are further based on a number of times that a read operation is executed on the table, a number of times that a write operation is executed on the table, and a number of rows in the table.

13. The computer-implemented system of claim 11, wherein the applying of the algorithm comprises:
processing the log to determine a subset of the tables identified in the log, the subset comprising tables that are accessed by the set of queries at a frequency that meets or exceeds a threshold; and
processing the log to identify tables from the subset that are accessed using a particular column or group of columns more often than other columns or groups of columns.

14. The computer-implemented system of claim 13, wherein the applying of the algorithm further comprises, for each of the tables identified from the subset:
processing the log to determine a first value indicative of a number of times that a read operation is executed on the table in the set of queries;
processing the log to determine a second value indicative of a number of times that a write operation is executed on the table in the set of queries; and
classifying the table as being predominantly for read operations or predominantly for write operations based on the first and second values.

15. The computer-implemented system of claim 14, wherein the applying of the algorithm further comprises, for each of the tables classified as being predominantly for read operations:
determining a number of rows included in the table; and
classifying the table as being a relatively large table or a relatively small table based on the number of rows included in the table.

16. The computer-implemented system of claim 15, wherein the applying of the algorithm further comprises, for (i) each of the tables classified as being predominantly for write operations, and (ii) each of the tables classified as being a relatively small table:
identifying a column or group of columns that are used to access the table more often than other columns or groups of columns; and
categorizing the table into a group of the multiple groups based on the identified column or group of columns.

17. A non-transitory computer-readable storage medium for categorizing tables of a database into groups, the computer-readable storage medium comprising computer executable instructions which, when executed, cause a processing system to execute steps including:
processing a set of queries used to access a database to generate a log that identifies for each of the queries (i) a database operation associated with the query, (ii) a table of the database accessed via the query, and (iii) a column or columns of the table used by the query to access the table;
accessing database operation criteria for categorizing database tables into groups, the database operation criteria being based on a total number of times that a table is accessed by the set of queries, and a number of times that the table is accessed using a column or group of columns; and
applying an algorithm that evaluates data of the log against the database operation criteria, the algorithm being configured to (a) automatically categorize the database tables identified in the log into multiple groups based on the evaluation, (b) classify the database tables as being predominantly for read operations or predominantly for write operations based on a ratio between a number of time that a read operation is executed in the set of queries and a total number of times that a read operation and a write operation is executed on the database tables, wherein the database tables are classified as being predominantly for read operations when the ratio meets or exceeds a read threshold, and (c) grouping together the database tables classified as predominantly for read operations based on a number of rows within each database table and the database tables classified as predominantly for write operations based on the number of times that each database table is accessed using the column or the group of columns.

18. The non-transitory computer-readable storage medium of claim 17, wherein the database operation criteria are further based on a number of times that a read operation is executed on the table, a number of times that a write operation is executed on the table, and a number of rows in the table.

19. The non-transitory computer-readable storage medium of claim 17, wherein the applying of the algorithm comprises:
    processing the log to determine a subset of the tables identified in the log, the subset comprising tables that are accessed by the set of queries at a frequency that meets or exceeds a threshold; and
    processing the log to identify tables from the subset that are accessed using a particular column or group of columns more often than other columns or groups of columns.

20. The non-transitory computer-readable storage medium of claim 19, wherein the applying of the algorithm further comprises, for each of the tables identified from the subset:
    processing the log to determine a first value indicative of a number of times that a read operation is executed on the table in the set of queries;
    processing the log to determine a second value indicative of a number of times that a write operation is executed on the table in the set of queries; and
    classifying the table as being predominantly for read operations or predominantly for write operations based on the first and second values.

* * * * *